US009910058B2

(12) United States Patent
Ruffino

(10) Patent No.: US 9,910,058 B2
(45) Date of Patent: Mar. 6, 2018

(54) METHOD AND DEVICE FOR MEASURING THE ANGLE OF ATTACK AND THE SIDESLIP OF AN AIRCRAFT

(71) Applicant: AIRBUS DEFENCES AND SPACE SAS, Les Mureaux (FR)

(72) Inventor: Fabrice Ruffino, Triel sur Seine (FR)

(73) Assignee: AIRBUS DEFENCE AND SPACE SAS, Les Mureaux (FR)

( * ) Notice: Subject to any disclaimer, the term of this patent is extended or adjusted under 35 U.S.C. 154(b) by 30 days.

(21) Appl. No.: 15/025,469

(22) PCT Filed: Oct. 14, 2014

(86) PCT No.: PCT/FR2014/000222
§ 371 (c)(1),
(2) Date: Mar. 28, 2016

(87) PCT Pub. No.: WO2015/059370
PCT Pub. Date: Apr. 30, 2015

(65) Prior Publication Data
US 2016/0231350 A1 Aug. 11, 2016

(30) Foreign Application Priority Data

Oct. 22, 2013 (FR) ...................................... 13 02442

(51) Int. Cl.
*G01P 13/02* (2006.01)
(52) U.S. Cl.
CPC .................................. *G01P 13/025* (2013.01)

(58) Field of Classification Search
CPC ...................................................... G01P 13/025
See application file for complete search history.

(56) References Cited

U.S. PATENT DOCUMENTS

| 2,701,473 | A |   | 2/1955  | Fieldgate       |           |
|-----------|---|---|---------|-----------------|-----------|
| 3,069,906 | A |   | 12/1962 | Eiland, Jr.     |           |
| 3,329,016 | A |   | 7/1967  | Leavens et al.  |           |
| 3,677,086 | A |   | 7/1972  | Corey           |           |
| 3,686,937 | A |   | 8/1972  | Corey           |           |
| 3,699,811 | A | * | 10/1972 | Maiden .......... | G01M 9/06 |
|           |   |   |         |                 | 73/147    |
| 5,406,839 | A | * | 4/1995  | Leblond ........ | G01P 13/025 |
|           |   |   |         |                 | 73/170.02 |
| 5,544,526 | A |   | 8/1996  | Baltins et al.  |           |

(Continued)

FOREIGN PATENT DOCUMENTS

| CH | 478 412 A   | 9/1969 |
|----|-------------|--------|
| FR | 1.069.339 A | 7/1954 |
| FR | 1270264 A   | 8/1961 |

OTHER PUBLICATIONS

Written Opinion of the International Searching Authority dated Feb. 16, 2015, issued in corresponding International Application No. PCT/FR2014/000222, filed Oct. 14, 2014, 9 pages.

(Continued)

*Primary Examiner* — Francis Gray
(74) *Attorney, Agent, or Firm* — Christensen O'Connor Johnson Kindness PLLC

(57) ABSTRACT

According to the present invention, use is made of a probe provided with a central sensor, with off-centered sensors and lateral sensors, and said probe is articulated on the aircraft around two orthogonal axes.

8 Claims, 1 Drawing Sheet

(56) References Cited

U.S. PATENT DOCUMENTS

2002/0166375 A1* 11/2002 Cronin ................ E21B 47/0006
73/152.01
2014/0230539 A1* 8/2014 Perju ..................... G01P 13/025
73/180

OTHER PUBLICATIONS

International Preliminary Report on Patentability dated Apr. 26, 2016, issued in corresponding International Application No. PCT/FR2014/000222, filed Oct. 14, 2014, 1 page.
International Search Report dated Feb. 16, 2015, issued in corresponding International Application No. PCT/FR2014/000222, filed Oct. 14, 2014, 3 pages.
Written Opinion of the International Searching Authority dated Feb. 16, 2015, issued in corresponding International Application No. PCT/FR2014/000222, filed Oct. 14, 2014, 7 pages.

* cited by examiner

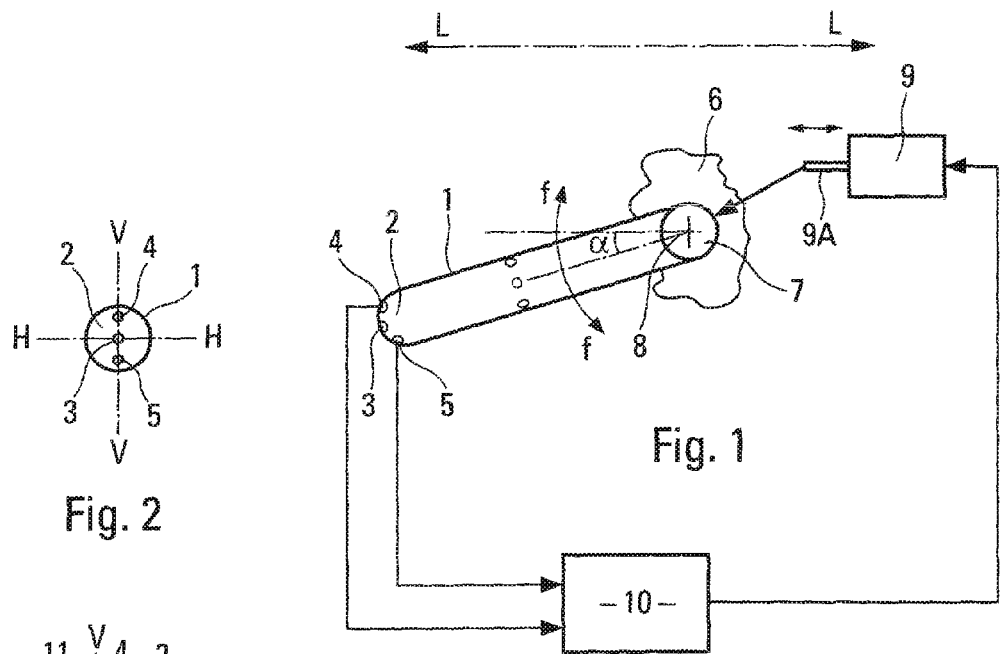
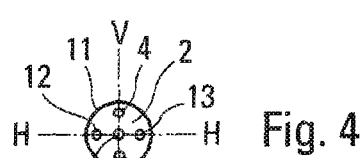
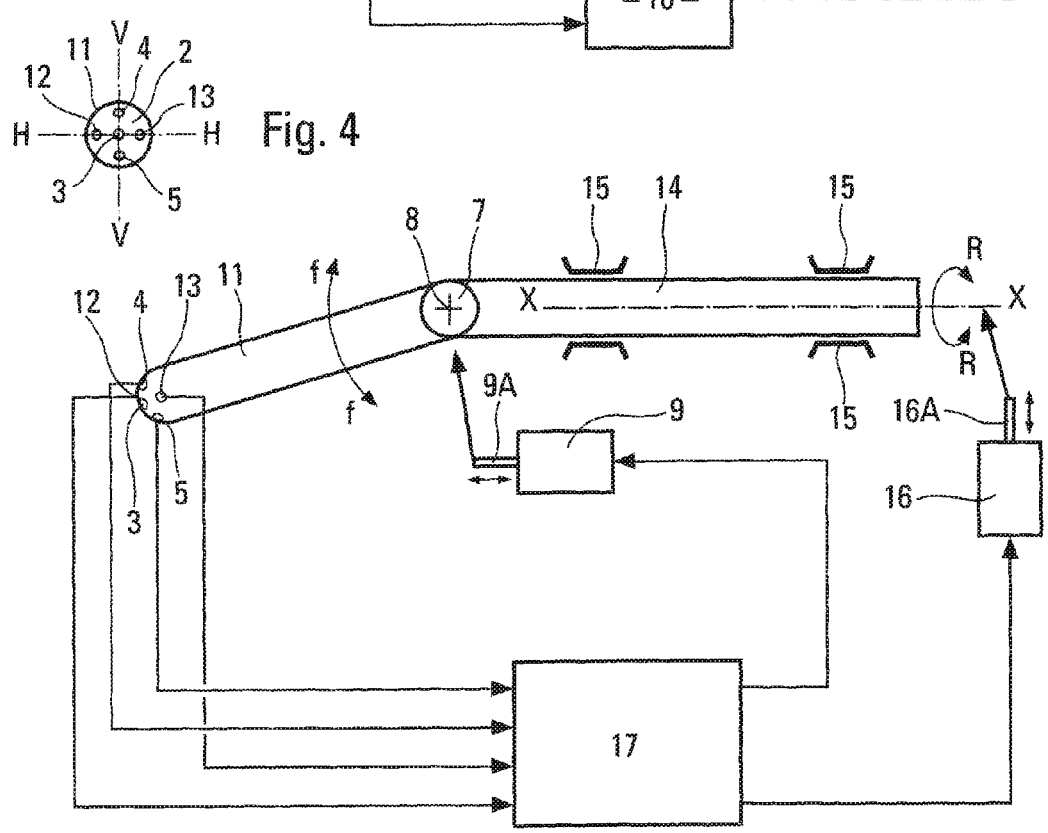

METHOD AND DEVICE FOR MEASURING THE ANGLE OF ATTACK AND THE SIDESLIP OF AN AIRCRAFT

The present invention relates to a method and to a device for measuring the angle of attack of an aircraft, said method and said device being able, more generally, to measure the air data information of said aircraft, and being insensitive to the Mach number, the temperature, and drift and skew errors.

In order to measure the angle of attack of an aircraft, a probe which is provided, at the front end thereof, with a central directional sensor which is arranged at the intersection of the horizontal and vertical midplanes of said probe, and with at least two eccentric directional sensors which are in parallel with said central directional sensor and are arranged at an equal distance therefrom on either side of said horizontal midplane of said probe, is already known, for example from U.S. Pat. No. 3,329,016. A probe of this kind is pivotally connected to the aircraft, the three sensors of said probe pointing forwards. Thus, in the event of a non-zero angle of attack, the relative wind is slanted with respect to the probe, such that the lateral directional sensors detect different total pressures, and therefore different air speeds. It is possible to determine the angle of attack of the aircraft from a pressure difference of this kind, by means of calibration.

The object of the present invention is to make it possible for an angle of attack probe of this kind to indicate the sideslip of the aircraft.

For this purpose, according to the invention, the method for measuring the angle of attack of the longitudinal axis of an aircraft with respect to the relative wind, according to which method a probe is used which is provided, at the front end thereof, with a central directional sensor which is arranged at the intersection of the horizontal and vertical midplanes of said probe, and with at least two eccentric midplane directional sensors which are in parallel with said central directional sensor and are arranged at an equal distance therefrom on either side of said horizontal midplane of said probe, according to which method:

said probe is pivotally connected to said aircraft about a first pivot axis which is in parallel with said horizontal midplane of said probe and is orthogonal to said longitudinal axis of the aircraft;

said probe is rotated about said first pivot axis in order make said probe assume the particular inclined position in which the measurements provided by said eccentric midplane directional sensors are equal; and the particular angle of inclination which is produced, in this particular inclined position, between said horizontal midplane of the probe and the longitudinal axis of the aircraft is measured, is characterised in that said probe is provided, at the front end thereof and in addition to said central directional sensor and said eccentric midplane directional sensors, with at least two lateral directional sensors which are in parallel with said central directional sensor and are arranged at an equal distance therefrom on either side of said vertical midplane of said probe, and in that, in addition, in order to measure the sideslip of the aircraft:

said probe is pivotally connected to said aircraft about a second pivot axis which is in parallel with said longitudinal axis of the aircraft;

said probe and said first pivot axis are rotated about said second pivot axis in order make said probe assume the particular combined inclined position in which not only are the measurements provided by said eccentric midplane directional sensors equal, but so too are the measurements provided by said lateral directional sensors; and the particular value of the angle of rotation of said second pivot axis in said particular combined inclined position of the probe is measured.

In this particular combined inclined position, it is clear that said probe is aligned with the relative wind, taking account of the sideslip, said sideslip being measured by said particular value of the angle of rotation of said second hinge pin.

Preferably, during the flight of said aircraft, said particular angle of inclination that is produced between the horizontal midplane of the probe and the longitudinal axis of the aircraft, and said particular value of the angle of rotation of said second pivot axis are continuously determined.

The central directional sensor, said eccentric midplane directional sensors, and said lateral directional sensors can be pressure sensors, which are particularly effective for subsonic aerobic flights. Nonetheless, said sensors can be of any type sensitive to the wind direction, such as force sensors or temperature sensors. For example, for supersonic or hypersonic flights, it is advantageous for said sensors to be thermocouples.

Preferably:

in order to rotate said probe about said first pivot axis, an actuator provided with a movable actuation member is used, and said particular angle of inclination is measured by the corresponding position of said movable actuation member of the actuator; and in order to rotate said probe and said first pivot axis about said second pivot axis, an actuator provided with a movable actuation member is used, and said value of the angle of rotation of said second pivot axis is measured by the corresponding position of said movable actuation member of said actuator.

The present invention further relates to a device for implementing the method described above.

According to the invention, the device for measuring the angle of attack of the longitudinal axis of an aircraft with respect to the relative wind, which comprises a probe provided, at the front end thereof, with a central directional sensor which is arranged at the intersection of the horizontal and vertical midplanes of said probe, and with at least two eccentric midplane directional sensors which are in parallel with said central directional sensor and are arranged at an equal distance therefrom on either side of said horizontal midplane of said probe, said device comprising:

first means for pivotally connecting said probe to said aircraft about a first pivot axis which is in parallel with said horizontal midplane of said probe and orthogonal to said longitudinal axis of the aircraft;

first means for rotating said probe about said first pivot axis in order to make said probe assume the particular inclined position in which the measurements provided by said eccentric midplane directional sensors are equal; and first means for measuring the particular angle of inclination which is produced, in this particular inclined position, between said horizontal midplane of the probe and the longitudinal axis, is characterised:

in that said probe is provided, at the front end thereof, in addition to said central directional sensor and said eccentric midplane directional sensors, with at least two lateral directional sensors which are in parallel with said central directional sensor and are arranged at an equal distance therefrom on either side of said vertical midplane of said probe; and in that said device further comprises second means for pivotally connecting said probe to said aircraft about a second pivot axis which is in parallel with said longitudinal axis of the aircraft;

second means for rotating said probe and said first pivot axis about said second pivot axis in order to make said probe assume the particular combined inclined position in which not only are the measurements provided by said eccentric midplane directional sensors equal, but so too are the measurements provided by said lateral directional sensors; and second means for measuring the particular value of the angle of rotation of said second pivot axis in said particular combined inclined position of the probe, said angle of rotation representing the sideslip of said aircraft.

The present invention further relates to an aircraft comprising a device for measuring the angle of attack and the sideslip as described above.

The figures of the accompanying drawings will give a better understanding of how the invention can be carried out. In these drawings, identical reference signs designate similar elements.

FIG. 1 is a schematic view of a known device for measuring the angle of attack of an aircraft.

FIG. 2 is an end view of the front end of the probe of the device from FIG. 1, on which the horizontal H-H and vertical V-V midplanes of said probe have been drawn.

FIG. 3 is a schematic view of an embodiment of a device for implementing the present invention.

FIG. 4 is an end view of the front end of the probe of the device from FIG. 3, on which the horizontal H-H and vertical V-V midplanes of said probe have also been drawn.

The known device shown schematically in FIGS. 1 and 2 comprises a probe 1 which is provided, at the profiled front end 2 thereof, with a central directional sensor 3 which is arranged at the intersection of the horizontal H-H and vertical V-V midplanes of said probe, and with two eccentric midplane directional sensors 4 and 5 which are in parallel with said central directional sensor 3, are arranged at an equal distance therefrom on either side of the horizontal midplane H-H of said probe, and are sensitive to the wind direction.

Said probe 1 is pivotally connected, by the rear end thereof, to an aircraft (shown only by means of the longitudinal axis L-L thereof and by a portion of fuselage 6) by means of a hinge device 7, the pivot axis 8 of which is in parallel with the horizontal midplane H-H of the probe 1 and orthogonal to the longitudinal axis L-L of the aircraft.

An actuator 9, for example an actuating cylinder, which is provided with a movable actuation member 9A, for example a piston, can rotate the probe 1 in both directions about the pivot axis 8, as shown by the double-headed arrow f. The actuator 9 is controlled by a control unit 10 which receives the measurements made by the eccentric midplane directional sensors 4 and 5 and makes the actuator 9 control the inclination of the probe 1 about the pivot axis 8 in such a way that said measurements from the eccentric midplane directional sensors 4 and 5 are equal. In this position, the probe 1 is aligned with the relative wind, such that the angle of inclination α of said probe with respect to the longitudinal axis L-L of the aircraft represents the angle of attack of the aircraft. The corresponding position of the movable actuation member 9A of the actuator 9 is the practical and simple measurement of said angle of inclination α, and therefore of the angle of attack. Moreover, for this inclined position of the probe 1 measuring the angle of attack of the aircraft, the central directional sensor 3 provides a reliable measurement of the magnitude which it detects. If said central directional sensor 3 is a Pitot tube, the reliable measurement which it provides is the total pressure.

During the flight of the aircraft, the actuator 9 and the control unit 10 preferably operate continuously, such that, at each moment, the probe 1 measures, by means of the inclination α thereof, the angle of attack of the aircraft.

In the embodiment of the device, in accordance with the present invention and shown schematically in FIGS. 3 and 4, the probe 1 is replaced by a probe 11 which is similar but which is provided, at the front end 2 thereof, in addition to the central directional sensor 3 and the eccentric midplane directional sensors 4 and 5, with two lateral directional sensors 12 and 13 of the same type which are in parallel with said central directional sensor 3 and are arranged at an equal distance therefrom on either side of the vertical midplane of the probe 11.

The rear hinge device 7 of the probe 11 is connected for conjoint rotation to a rod 14 which is rotatably mounted about a pivot axis X-X which is in parallel with the longitudinal axis L-L of the aircraft, which is shown in FIG. 3 by bearings 15 for the rod 14. Thus, in the device from FIG. 3, the probe 11 can be rotated in a combined manner, both about the line 8 which is orthogonal to the longitudinal axis L-L of the aircraft and about the line X-X which is in parallel with said longitudinal axis L-L.

An actuator 16, for example an actuating cylinder, which is provided with a movable actuation member 16A, for example a piston, can rotate the probe 11 and the pivot axis 8 in both directions about the pivot axis X-X, as shown by the double-headed arrow R-R. The actuators 9 and 16 are respectively controlled by a control unit 17 which receives the measurements made by the eccentric midplane directional sensors 4 and 5 and the measurements made by the lateral directional sensors 12 and 13. The control unit 17 makes the actuators 9 and 16 control the inclination of the probe 11 about the pivot axes 8 and X-X respectively in such a way that the measurements from the eccentric midplane directional sensors 4 and 5 are equal and the measurements from the lateral directional sensors 12 and 13 are also equal.

Thus, in the event of sideslip of the aircraft, the probe 11 can be perfectly aligned with the relative wind. In this combined position aligned with the relative wind, the value of the inclination of the probe 11 about the axis 8 (indicated for example by the position of the movable actuation member 9A) represents the angle of attack, while the value of the inclination of the probe 11 about the line X-X (indicated for example by the position of the movable actuation member 16A) represents the sideslip of the aircraft.

Of course, during the flight of the aircraft, it is possible to continuously determine the values of the angle of attack and of the sideslip of the aircraft in the manner described above.

The invention claimed is:

1. Method for measuring the angle of attack of the longitudinal axis of an aircraft with respect to the relative wind, in which method a probe is used which is provided, at the front end thereof, with a central directional sensor which is arranged at the intersection of the horizontal and vertical midplanes of said probe, and with at least two eccentric midplane directional sensors which are in parallel with said central directional sensor and are arranged at an equal distance therefrom on either side of said horizontal midplane of said probe, the method comprising:

pivotally connecting said probe to said aircraft about a first pivot axis which is in parallel with said horizontal midplane of said probe and is orthogonal to said longitudinal axis of the aircraft;

rotating said probe about said first pivot axis in order to make said probe assume the particular inclined position in which the measurements provided by said eccentric midplane directional sensors are equal; and measuring the particular angle of inclination which is produced, in this particular inclined position, between said horizontal midplane of the probe and the longitudinal axis (L-L) of the aircraft, wherein said probe is provided, at the front end thereof and in addition to said central directional sensor and said eccentric midplane directional sensors, with at least two lateral directional sensors which are in parallel with said central directional sensor and are arranged at an equal distance therefrom on either side of said vertical midplane of said probe, and wherein, in order to measure the sideslip of the aircraft, the method comprises:

pivotally connecting said probe to said aircraft about a second pivot axis which is in parallel with said longitudinal axis of the aircraft;

rotating said probe and said first pivot axis about said second pivot axis in order make said probe assume the particular combined inclined position in which not only are the measurements provided by said eccentric midplane directional sensors equal, but so too are the measurements provided by said lateral directional sensors; and measuring the particular value of the angle of rotation of said second pivot axis in said particular combined inclined position of the probe.

2. Method according to claim 1, wherein, during the flight of the aircraft, said particular angle of inclination which is produced between the horizontal midplane of the probe and the longitudinal axis of the aircraft, and said particular value of the angle of rotation of said second pivot axis are continuously determined.

3. Method according to claim 1, wherein said central directional sensor, said eccentric midplane directional sensors, and said lateral directional sensors are of the same type.

4. Method according to claim 3, wherein said central directional sensor, said eccentric midplane directional sensors, and said lateral directional sensors are pressure sensors.

5. Method according to claim 3, wherein said central directional sensor, said eccentric midplane directional sensors, and said lateral directional sensors are temperature sensors.

6. Method according to claim 1, wherein
in order to rotate said probe about said first pivot axis, an actuator provided with a movable actuation member is used, and said particular angle of inclination is measured by the corresponding position of said movable actuation member of the actuator; and in order to rotate said probe and said first pivot axis about said second pivot axis, an actuator provided with a movable actuation member is used, and said value of the angle of rotation of said second pivot axis is measured by the corresponding position of said movable actuation member of said actuator.

7. Device for measuring the angle of attack of the longitudinal axis of an aircraft with respect to the relative wind, comprising a probe which is provided, at the front end thereof, with a central directional sensor which is arranged at the intersection of the horizontal and vertical midplanes of said probe, and with at least two eccentric midplane directional sensors which are in parallel with said central directional sensor and are arranged at an equal distance therefrom on either side of said horizontal midplane of said probe, said device comprising:

first means for pivotally connecting said probe to said aircraft about a first pivot axis which is in parallel with said horizontal midplane of said probe and orthogonal to said longitudinal axis of the aircraft;

first means for rotating said probe about said first pivot axis in order to make said probe assume the particular inclined position in which the measurements provided by said eccentric midplane directional sensors are equal; and first means for measuring the particular angle of inclination which is produced, in this particular inclined position, between said horizontal midplane of the probe and the longitudinal axis of the aircraft, wherein said probe is provided, at the front end thereof, in addition to said central directional sensor and said eccentric midplane directional sensors, with at least two lateral directional sensors which are in parallel with said central directional sensor and are arranged at an equal distance therefrom on either side of said vertical midplane of said probe; and said device further comprises:

second means for pivotally connecting said probe to said aircraft about a second pivot axis which is in parallel with said longitudinal axis of the aircraft;

second means for rotating said probe and said first pivot axis about said second pivot axis in order to make said probe assume the particular combined inclined position in which not only are the measurements provided by said eccentric midplane directional sensors equal, but so too are the measurements provided by said lateral directional sensors; and second means for measuring the particular value of the angle of rotation of said second pivot axis in said particular combined inclined position of the probe, said angle of rotation representing the sideslip of said aircraft.

8. Aircraft comprising a device for measuring the angle of attack and the sideslip according to claim 7.

* * * * *